(12) United States Patent
Cho et al.

(10) Patent No.: US 12,243,611 B2
(45) Date of Patent: Mar. 4, 2025

(54) DETECTING LASER-INJECTED FAULTS

(71) Applicant: Intel Corporation, Santa Clara, CA (US)

(72) Inventors: Minki Cho, Portland, OR (US); Daniel Nemiroff, El Dorado Hills, CA (US); Carlos Tokunaga, Beaverton, OR (US); James W. Tschanz, Portland, OR (US); Kah Meng Yeem, Folsom, CA (US); Yaxin Shui, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 17/856,897

(22) Filed: Jul. 1, 2022

(65) Prior Publication Data

US 2024/0005962 A1 Jan. 4, 2024

(51) Int. Cl.
*G11C 5/00* (2006.01)

(52) U.S. Cl.
CPC .................................. *G11C 5/005* (2013.01)

(58) Field of Classification Search
CPC ....... G11C 19/00; G11C 11/401; G11C 16/22; G11C 29/12; G11C 29/44; G11C 5/005; G11C 7/24; G11C 29/52; G11C 7/1087; G11C 7/1093; H03K 3/037; H03K 5/05; H03K 3/012; H03K 3/0375; H03K 3/011; H03K 5/1534; H03K 5/26; H03K 19/20; H03K 5/00; H03K 5/131; H03K 5/133; H03K 3/033; H03K 3/53; H03K 3/57; H03K 3/64; H03K 19/21; H03K 2005/00026; H03K 2005/00058; H03K 3/353; H03K 3/356104; H03K 3/66; H03K 5/04; H03K 5/06; H03K 5/156; H03K 17/223; H03K 19/00384; H03K 19/09429; H03K 3/0233; H03K 3/0315; H03K 3/356043; H03K 3/356156; H03K 5/13; H03K 5/135; H03K 5/15; G02B 2027/0178; G02B 27/0101; G02B 27/0172

See application file for complete search history.

(56) References Cited

U.S. PATENT DOCUMENTS 7,724,058 B2 * 5/2010 Saint-Laurent ........ H03K 3/037
327/299

OTHER PUBLICATIONS

Di-Battista, Jerome, et al., "When Failure Analysis Meets Side-Channel Attacks", CHES 2010, 15 pgs.
(Continued)

*Primary Examiner* — Thong Q Le
(74) *Attorney, Agent, or Firm* — NICHOLSON DE VOS WEBSTER & ELLIOTT LLP

(57) ABSTRACT

An integrated circuit (IC) die comprises a sensor, which includes a pulse generator and a pulse expander. The pulse generator comprises gate circuits coupled to each other in an in-series arrangement. An input of the pulse generator is coupled to receive a voltage and the pulse generator is to generate a first signal based on the voltage. The pulse generator is to generate a first pulse of the first signal based on an event wherein radiation from a laser is incident upon the pulse generator. The pulse expander is coupled to receive the first signal from the pulse generator and to generate a second signal based on the first signal, wherein a second pulse of the second signal is based on the first pulse. A first duration of the first pulse is less than a second duration of the second pulse.

20 Claims, 7 Drawing Sheets

(56) References Cited

OTHER PUBLICATIONS

Firiti, A., et al., "Implementing Thermal Laser and Photoelectric Laser Stimulation in a Failure Analysis Labratory", Proceedings of 10th IPFA 2003, Singapore, 3 pgs.
He, Wei, et al., "Ring Oscillator under Laser: Potential of PLL based Countermeasure against Laser Fault Injection", 2016 Workshop on Fault Diagnosis and Tolerance in Cryptography, 12 pgs.
Kumar, Saurabh, et al., "An Ultra-Dense Irradiation Test Structure with a NAND/NOR Readout Chain for Characterizing Soft Error Rates of 14nm Combinational Logic Circuits", IEDM 2017, 4 pgs.
Lewis, Dean, et al., "Backside Laser Testing of ICs for SET Sensitivity Evaluation", IEEE Transactions on Nuclear Science, vol. 48, No. 6, Dec. 2001, 9 pgs.
Lohrke, Heiko, et al., "Key Extraction Using Thermal Laser Stimulation", IACR Transactions on Cryptographic Hardware and Embedded Systems ISSN 2569-2925, vol. 2018, No. 3, pp. 573-595.
Lu, Feng, et al., "Customized Cell Detector for Laser-Induced-Fault Detection", 2014 IEEE 20th International On-Line Testing Symposium (IOLTS), 6 pgs.
Samyde, David, et al., "On a New Way to Read Data from Memory", Proceedings of the First International IEEE Security in Storage Workshop (SISW'02), 5 pgs.

\* cited by examiner

DETECTING LASER-INJECTED FAULTS

BACKGROUND

1. Technical Field

This disclosure relates to integrated circuits, and more specifically, to detecting laser-injected faults in integrated circuits.

2. Background Art

Integrated circuits (ICs) may include memories that are used to store secret, confidential, or otherwise sensitive information. For example, ICs may store authentication information, such as private keys and passwords. ICs used by individuals may store personal information, such as account numbers, addresses, and medical information. ICs used by businesses may store proprietary information, such as business plans, customer lists, and confidential technical information.

In addition to memories, ICs may include circuitry to implement security features in computing devices. Furthermore, in order for circuitry in an IC to operate securely, it must operate correctly as designed. For example, secure operation of an IC requires that signals in a digital circuit propagate between gates with correct values and in accord with correct clock signals.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only. Elements of the figures having the same reference numbers (or names) as the elements of any other figure can operate or function in any manner similar to that described, but are not limited to such.

DETAILED DESCRIPTION

Figure 1A:
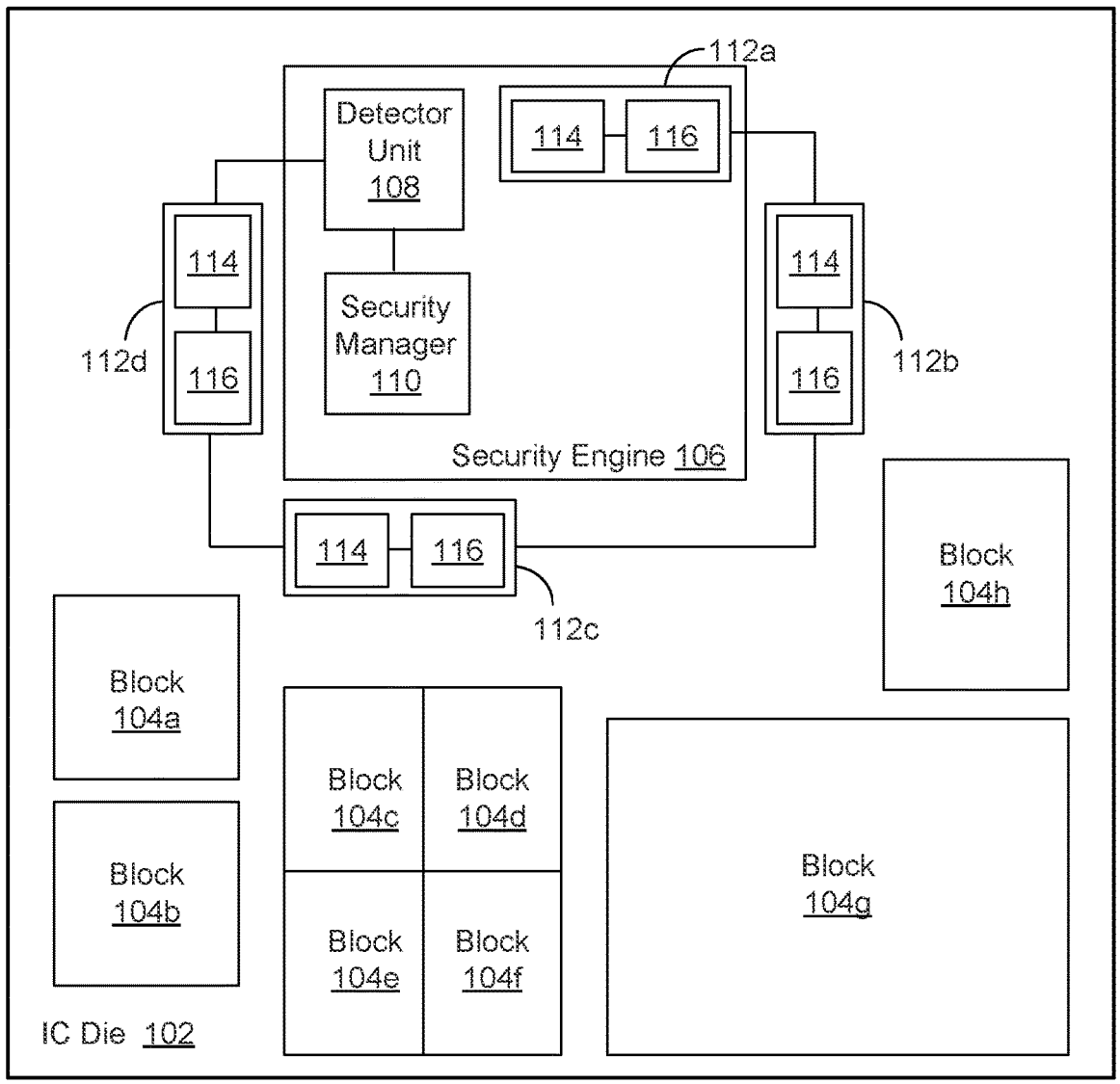
FIG. 1A is a functional block diagrams illustrating an integrated circuit die comprising circuitry comprising sensors to detect laser-injected faults.

Integrated circuits (ICs) may include memories storing secret or confidential information, or include circuitry to implement security features. In addition, in order for ICs to operate securely, they need to operate correctly. However, an actor with malicious intent may bypass security features or disrupt circuit operation by scanning a laser across all or a portion of an IC die. For example, a laser may be used to bypass a secure boot operation. Other examples include the use of lasers to flip bits in memories that store secure content, induce timing faults by changing clock frequencies, or increase transition times in digital gates. Lasers may even be used to enhance power side-channel attacks with an extra side-channel acquired with the laser.

Various embodiments are directed to circuitry to detect a laser fault-injection (LFI)/scanning laser photoelectric attack on an IC device. Sensor circuitry may be distributed near or within, or both near and within, a critical functional block while minimizing the area, power, and overhead required for the detection circuitry. An advantage of some embodiments of an LFI detection platform is that it uses a family of circuits with a small footprint and digital cells. Another advantage of some embodiments is that the cells have no active current in order to detect charge injection from a laser attack. Embodiments capture the behavior of circuits within a block under protection and include an interface to a system that processes the signature of a laser attack.

In embodiments, sensors may be placed near and within, a "functional block," which generally refers to any circuitry that can perform a particular function or functions. A functional block may be a unit of logic, circuit, cell, or chip layout that is reusable. A functional block is sometimes colloquially referred to by one of ordinary skill in the art as an IP (intellectual property) block. Examples of functional blocks include circuitry that can perform any type of processing function, such as processor cores, floating-point processors, or graphics processors. Other examples of functional blocks include circuitry that can perform any type of control function, such as memory controllers, bus controllers, network interface controllers, and display controllers. Further examples of functional blocks include circuitry that can perform any type of data transmitting or receiving function, such as transmitters, receivers, and transceivers. In still further examples, functional blocks include circuitry that can perform any type of storage function, such as memories, caches, and registers. In yet other examples, functional blocks include circuitry that can perform any type of security-related function, such as encryption/decryption, authorization, detection of unauthorized access, detection of tampering or probing, and generating responses to unauthorized access, tampering, or probing attempts. One or more portions of a larger functional block can themselves be designated as functional blocks. For example, an instruction execution unit and cache controller can be functional units or components of a processor functional unit. In other examples, digital logic circuits, such as adders or decoders, and analog circuits, such as a power supply or an amplifier, may be functional units that can be part of a larger functional unit. It should be appreciated that the foregoing examples are a non-exhaustive list of functional blocks.

Embodiments of the LFI detection platform described herein may be applicable to protecting a security engine integrated into an SoC (system on a chip), chipset, CPU, discrete graphics chip, or memory. As described herein, an array of LDC sensors may be synthesized during the structural design and physical layout phase of the semiconductor design and manufacturing process. In various embodiments, the array of sensors covers the areas of the security engine or other functional blocks that are deemed sensitive or vulnerable, or for which detection of a laser-induced event or attack is deemed important.

Some known circuitry for detecting LFI consumes dynamic current, which requires tuning of the frequency of a switching oscillator and signal filtering. In comparison with this known circuitry, an advantage of some embodiments is that no active current, frequency tuning, or active filtering is needed to detect charge injection from a laser attack.

FIG. 1A is a functional block diagram schematically illustrating an integrated circuit (IC) die 102 comprising circuitry to detect laser-injected faults in accordance with some embodiments. IC die 102 may be any type of IC, e.g., a SOC (System-on-Chip), a processor, a digital signal processor, a memory, and/or the like. IC die 102 may include analog, digital, or mixed signal circuitry. IC die 102 may be packaged by itself or included in a package with other ICs. IC die 102 comprises one or more functional blocks 104a, 104b, 104c, 104d, 104e, 104f, 104g, and 104h. In some embodiments, functional blocks 104 may be "logic" or "IP" (intellectual property) blocks. Each functional block 104 includes circuitry to perform one or more functions. It is contemplated that functional blocks 104 will differ in number and function in various embodiments. For example, blocks 104c, 104d, 104e, and 104f may each be a processor core, and block 104g may be a memory. IC die 102 comprises multiple interconnects (not shown) of various types, such as busses, through-silicon-vias (TSVs), hardware interfaces for connecting to a printed circuit board (PCB) or other IC devices.

Elements referred to herein with a common reference label followed by a particular number or letter may be collectively referred to by the reference label alone. For example, functional blocks 104a, 104b, 104c, 104d, 104e, 104f, 104g, and 104h may be collectively and generally referred to as functional blocks 104 in plural, and functional block 104 in singular. Similarly, elements shown in a figure with a common reference label followed by a particular number or letter may be collectively referred to in this description by the reference label alone.

In various embodiments, IC die 102 comprises a security engine 106, which includes a detector unit 108 to detect an event and a security manager 110 to provide a security response based on detection of the event. In addition, in various embodiments, IC die 102 comprises two or more sensors 112a, 112b, 112c, and 112d, which may be arranged in a "daisy chain" or "in-series arrangement," as described herein. Each sensor 112 comprises a pulse generator 114 and a pulse expander 116. The detector unit 108 is coupled with the sensors 112, as explained herein. The security manager 110 is coupled with the detector unit 108 and provides the security response in response to a signal from the detector unit 108.

The pulse generators 114 include two or more gate circuits connected in series. Pulse generators 114 may also be referred to as detector circuitry. When radiation from a laser reaches one of the pulse generators 114, a short pulse is induced in one of the gate circuits within the pulse generator 114. The pulse is amplified in magnitude by the gain of the gate circuit and transmitted along to a next gate circuit within the pulse generator 114. The last gate circuit in the chain transmits the pulse to the pulse expander circuit 116, which expands the pulse that is generated by the pulse generator circuit 114. In addition, the pulse expander circuit 116 combines a pulse propagated by a previous sensor 112.

Sensors 112 may be employed to detect a laser-induced event or attack on a portion of IC die 102 or on the entire IC die 102. Sensors 112 may be placed at various locations, such as locations in close physical proximity with a functional block deemed sensitive or vulnerable, or a functional block for which detection of a laser-induced event or attack is deemed important. In some embodiments, one or more sensors 112 are placed within a functional block, e.g., sensor 112a is placed within security engine 106. In some embodiments, one or more sensors 112 are placed in close physical proximity with a functional block, e.g., sensors 112b, 112c, and 112d are placed at locations in close physical proximity with security engine 106. In some embodiments, the security engine 106 is deemed sensitive or vulnerable and detection of a laser-induced event or attack on security engine 106 is deemed important.

Figure 1B:
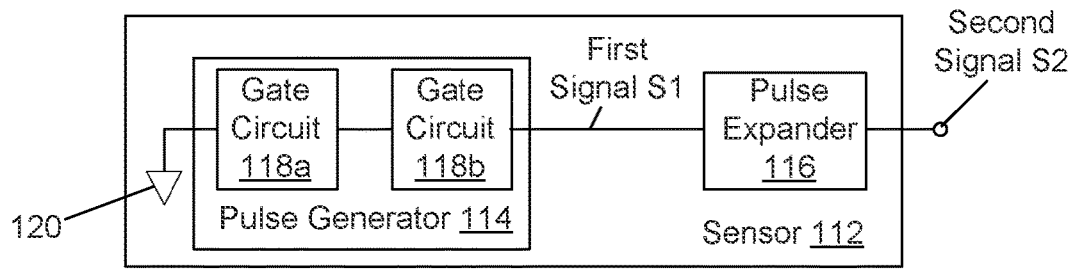
FIG. 1B illustrates a sensor of FIG. 1A in accordance with some embodiments.

FIG. 1B is a functional block diagram schematically illustrating a sensor 112 that can be used to detect laser-injected faults in accordance with some embodiments. Sensor 112 includes pulse generator 114, which comprises multiple gate circuits 118a, 118b coupled to each other in an in-series arrangement. Pulse generator 114 may comprise any suitable number of gate circuits 118. In some embodiments, pulse generator 114 includes at least two gate circuits 118, while in another embodiment pulse generator 114 includes six gate circuits 118. An input of the pulse generator 114 is coupled to receive a voltage 120, which may be a ground potential in some embodiments or a supply voltage in other embodiments. Pulse generator 114 generates a first signal S1 at an output based on the ground or supply voltage 120. An event may occur when radiation from a laser is incident upon one of the gate circuits within the pulse generator 114. In various embodiments, the pulse generator 114 may generate a first pulse P1 of the first signal S1 based on an event. The first pulse P1 has a first duration, which may be related to the energy of and length of time radiation is incident on the pulse generator 114.

Sensor 112 includes pulse expander 116, which is coupled to receive the first signal S1 from the pulse generator 114 and generate a second signal S2 based on the first signal S1. Pulse expander 116 may expand the length of the first duration of first pulse P1. In various embodiments, second signal S2 includes a second pulse P2. The second pulse P2 of the second signal S2 is based on the first pulse P1 and has a second duration. In embodiments, the first duration of the first pulse P1 is less than the second duration of the second pulse P2.

Figure 2A:
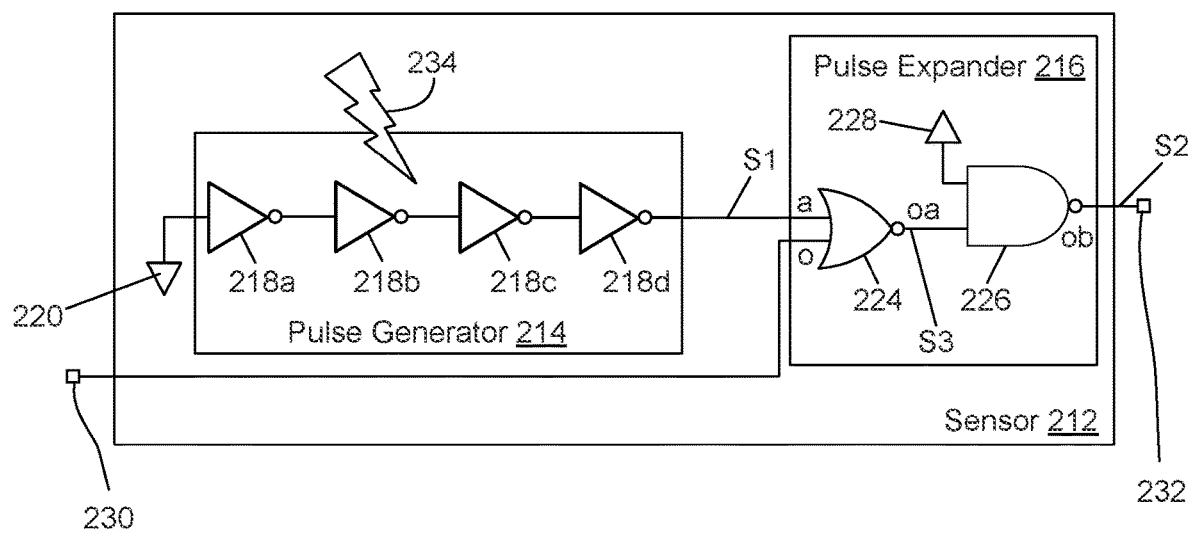
FIG. 2A and FIG. 2B are functional block diagrams respectively illustrating a sensor comprising a pulse expander that can be used to detect laser-injected faults and a timing diagram illustrating the propagation of a pulse through the pulse expander in accordance with some embodiments.

FIG. 2A is a functional block diagram schematically illustrating a sensor 212 that can be used to detect laser-injected faults in accordance with some embodiments. Sensor 212 includes pulse generator 214, which comprises multiple gate circuits 218a, 218b, 218c, and 218d coupled to each other in an in-series arrangement. In embodiments, the gate circuits 218 comprise static inverters, which may be of sizes that are maximized for sensitivity to laser radiation. In embodiments, the gate circuits 218 comprise devices of a size and type that are similar to or the same as circuits within a block under protection so as to capture the behavior of circuits within the protected block. For example, gate circuit 218 can be a static inverter, which includes one PMOS (p-channel metal-oxide semiconductor) transistor and one NMOS (n-channel metal-oxide semiconductor) transistor. As is known in the art, the gates of the PMOS and NMOS transistors of a static inverter are connected to form an input to the inverter, while the drains of both transistors are connected to form an output. The source of the PMOS transistor is connected to a supply voltage and the source of the NMOS transistor is connected to a common reference voltage, e.g., ground. While gate circuits 218 comprise static inverters in some embodiments, as shown in FIG. 2A, other types of gate circuits can be used, e.g., OR gates, AND gates, NOR gates, NAND gates, XOR gates, etc. In addition, pulse generator 214 may comprise any suitable number of gate circuits 218, e.g., 2, 4, 6, 8, 12, etc. An input of the pulse generator 214 is coupled to receive a voltage 220, which may be a ground potential or a supply voltage.

Pulse generator 214 generates a first signal S1 at an output based on the voltage 220. Radiation from a laser that is incident upon the pulse generator 214 is depicted by symbol 234. When radiation from the laser strikes a gate circuit 218, the strike itself or the resulting charge generation within materials of the gate circuit can be referred to as an "event." The individual gate circuit 218 where radiation is incident may generate a pulse, which is propagated to a next gate circuit. As a result, in various embodiments, pulse generator 214 may generate a first pulse P1 of the first signal S1 based on an event. The first pulse P1 has a first duration.

Sensor 212 includes pulse expander 216, which is coupled to receive the first signal S1 from the pulse generator 214 and generate a second signal S2 based on the first signal S1. In various embodiments, pulse expander 216 includes a NOR gate 224 coupled to receive the first signal S1 from pulse generator 214. A first input "a" of NOR gate 224 is coupled to receive the output of the pulse generator 214. A second input "o" of NOR gate 224 is coupled to receive an input 230 to the sensor 212. The input 230 is coupled with the output of another sensor 212, unless it is the first sensor in the daisy chain, in which case input 230 may be coupled with a reference voltage corresponding with a logic zero, e.g., ground. In addition, NOR gate 224 includes an output "oa" at which it provides a third signal S3 based on the first signal S1.

The pulse expander 216 also includes a NAND gate 226, which has two inputs. A first input the NAND gate 226 is coupled to receive the third signal S3 from NOR gate 224. A second input of the NAND gate 226 is coupled to receive a voltage 228, which may be a supply voltage (logic value "1"). NAND gate 226 also includes an output "ob" at which it generates the second signal S2 based on the third signal S3. The second signal is placed on output 232 of the sensor 212. Pulse expander 216 may expand the length of the first duration of first pulse P1. In various embodiments, second signal S2 includes a second pulse P2. The second pulse P2 of the second signal S2 is based on the first pulse P1 and has a second duration. In embodiments, the first duration of the first pulse P1 is less than the second duration of the second pulse P2.

An advantage of sensor 212 is that gate circuits 218, NOR gate 224, and NAND gate 226 consume no current other than leakage current. In addition, the area overhead of these gates may be insignificant in comparison to a sensitive functional block the sensor is to protect. In an embodiment, sensor 212 contains six standard cell gates. It will be understood by one of ordinary skill in the art that if a block is security sensitive, the pitch of the unit cells needs to be reduced as much as possible. Because of its relatively small area, sensor 212 can be arrayed very tightly in any block.

Figure 2B:
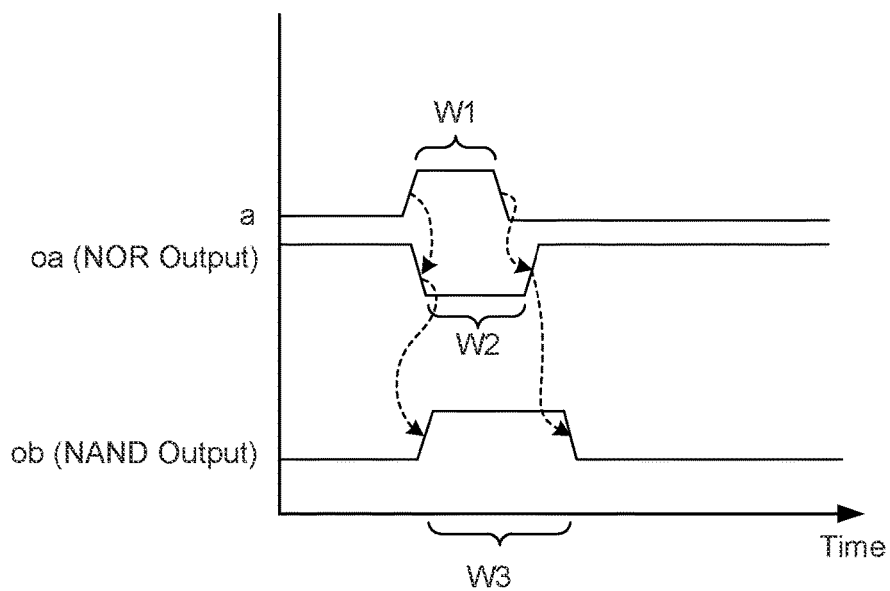

FIG. 2B is a timing diagram illustrating the propagation of a pulse through pulse expander 216. FIG. 2B assumes that a laser induces charge in a gate 218, which results in a pulse being generated in the pulse generator, which is propagated to the "a" input of pulse expander 216.

Figure 3A:
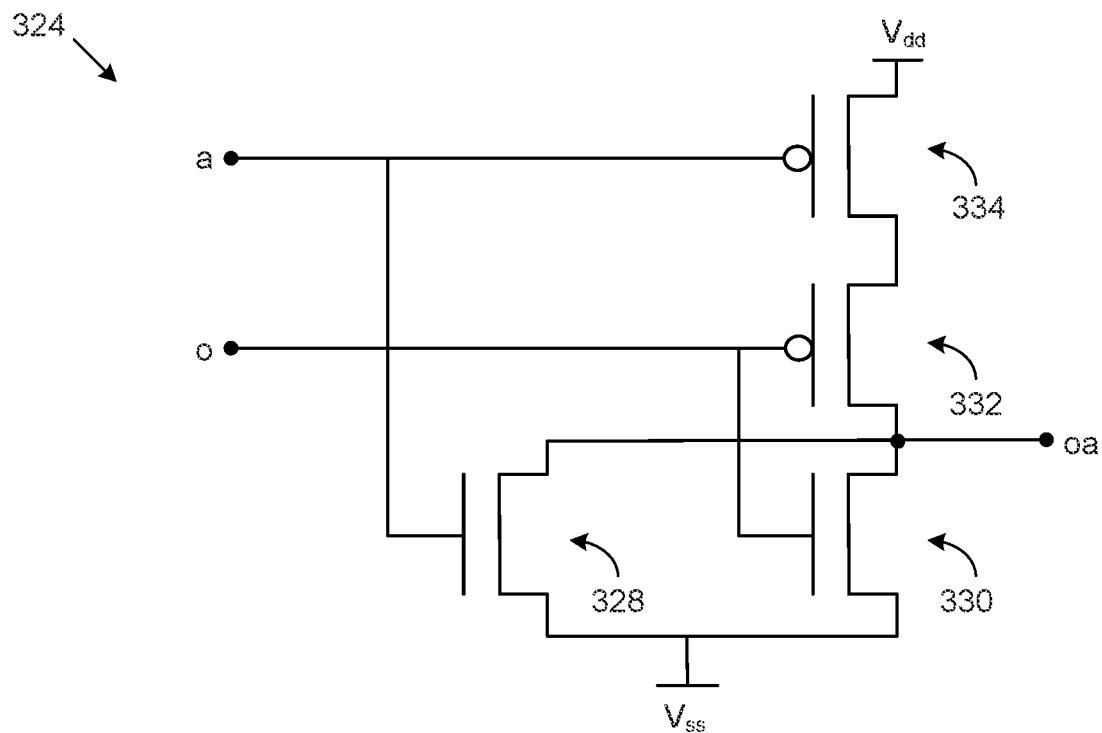
FIG. 3A and FIG. 3B are functional block diagrams respectively illustrating a NOR gate and a NAND gate that may be used in a pulse expander in accordance with some embodiments.

Referring to FIG. 2B, an input pulse having a width W1 is received from the pulse generator at input "a" of NOR gate 224 and an output pulse having a width W2 is generated at output "oa." Because NOR gate 224 is faster on the pull down through the parallel NMOS devices than the pull-up through series PMOS devices (the arrangement of devices is shown in FIG. 3A), the pulse width of W2 of the output is expanded relative to the width W1 of the input. The output pulse from NOR gate 224, having the width W2, is input to NAND gate 226 and an output pulse having a width W3 is generated by the NAND gate 226 at output "ob." Because the NAND gate is faster on the pull-up through parallel PMOS devices than the pull down through series NMOS devices (the arrangement of devices is shown in FIG. 3B), the pulse width W3 at the output "ob" is expanded relative to the pulse width W2 of the input "oa." Thus, both the NOR gate 224 and NAND gate 226 stages expand a received pulse and the total amount of expansion by pulse expander 216 is the sum of the individual pulse expansions by each of gates 224 and 226.

FIG. 3A is a functional block diagram schematically illustrating a NOR gate 324 that may be used in a pulse expander, e.g., pulse expander 216, in various embodiments. In the following discussion of FIGS. 3A and 3B, it is assumed that each of the PMOS and NMOS transistors are modeled as a resistor in series with an ideal switch and that all transistors have similar sizes. In addition, Vss stands for zero volts or a common ground, and VDD stands for supply voltage.

Referring to FIG. 3A, NOR gate 324 includes inputs "a," "o," and output "oa." NOR gate 324 comprises parallel NMOS transistors 328 and 330, and PMOS transistors 332 and 334 stacked in series. For the output "oa" to be pulled high (a transition from "0" to "1"), both PMOS transistors 332, 334 must be turned on. Pull-up and pull-down times are a function of an RC time constant, and the duration of low-to-high and high-to-low transitions can be compared using only resistance values. To determine pull-up time, the resistances of the two serially connected PMOS transistors 332, 334 are summed. For the output "oa" to be pulled low (a transition from "1" to "0") only one of the NMOS transistors 328, 330 must be turned on. To determine pull-down time for the case where one NMOS transistor is on, the resistance of a single NMOS transistor is used. The resistances of two serially connected devices is greater than the resistance of a single device. Accordingly, the pull-up time transition time of NOR gate 324 is greater than the pull-down transition time. When a pulse is received on input "a," for example, the width of the pulse at output "oa" will be expanded relative to the input since the pull-down transition time is faster through the parallel NMOS devices than the pull-up time through series connected PMOS devices.

Figure 3B:
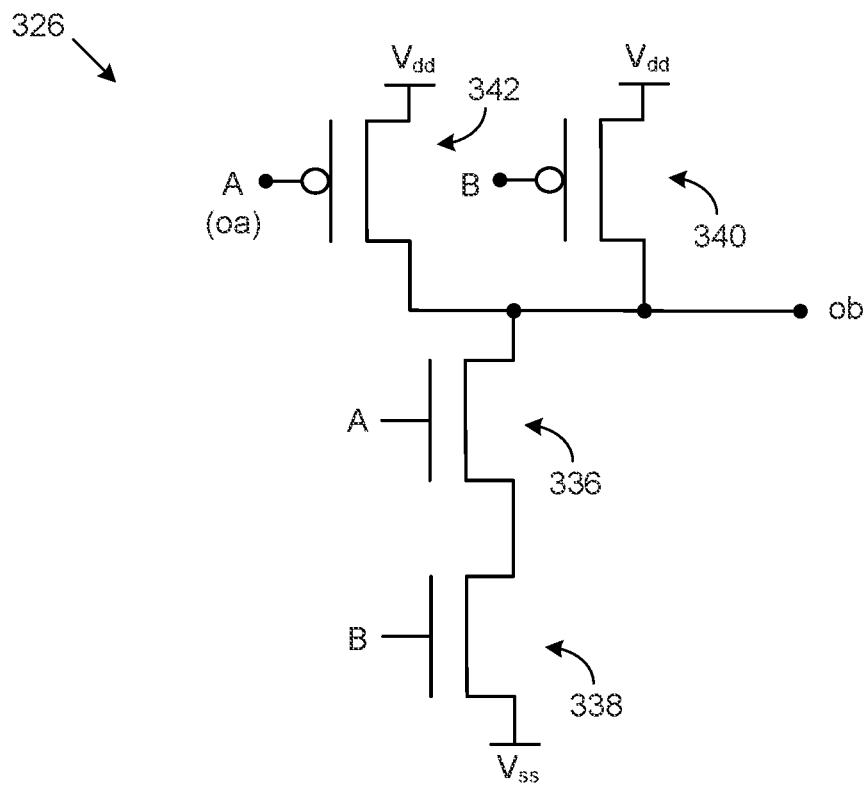

FIG. 3B is a functional block diagram schematically illustrating a NAND gate 326 that may be used in a pulse expander, e.g., pulse expander 216, in various embodiments. NAND gate 326 includes first input "A," second input "B," and output "ob." In an embodiment, first input A is coupled to output "oa" of NOR gate 324 and second input "B" is coupled with a supply voltage (logic value "1"). NAND gate 326 comprises NMOS transistors 336 and 338 stacked in series and parallel PMOS transistors 340 and 342. For the output "ob" to be pulled high (a transition from "0" to "1"), either one of PMOS transistors 340, 342, or both, must be turned on. Since input B is tied high it is always on, so only PMOS transistors 342 must be turned on for the output to be pulled high. In this case, the resistances of the parallel PMOS transistors 340, 342 is used to determine pull-up time. For the output "oa" to be pulled low (a transition from "1" to "0"), both of NMOS transistors 336, 338 must be turned on. In this case, the resistances of the two serially connected NMOS transistors is used to determine pull-down time. The resistance of the parallel devices is less than the resistance of the two serially connected devices. Accordingly, the pull-up time transition time of NAND gate 326 is shorter than the pull-down transition time. When a pulse is received on input A ("a"), for example, the width of the pulse at output "ob" will be expanded relative to the input since the pull-up transition time is faster through the parallel PMOS devices than the pull-down time through series connected NMOS devices.

Figure 4A:
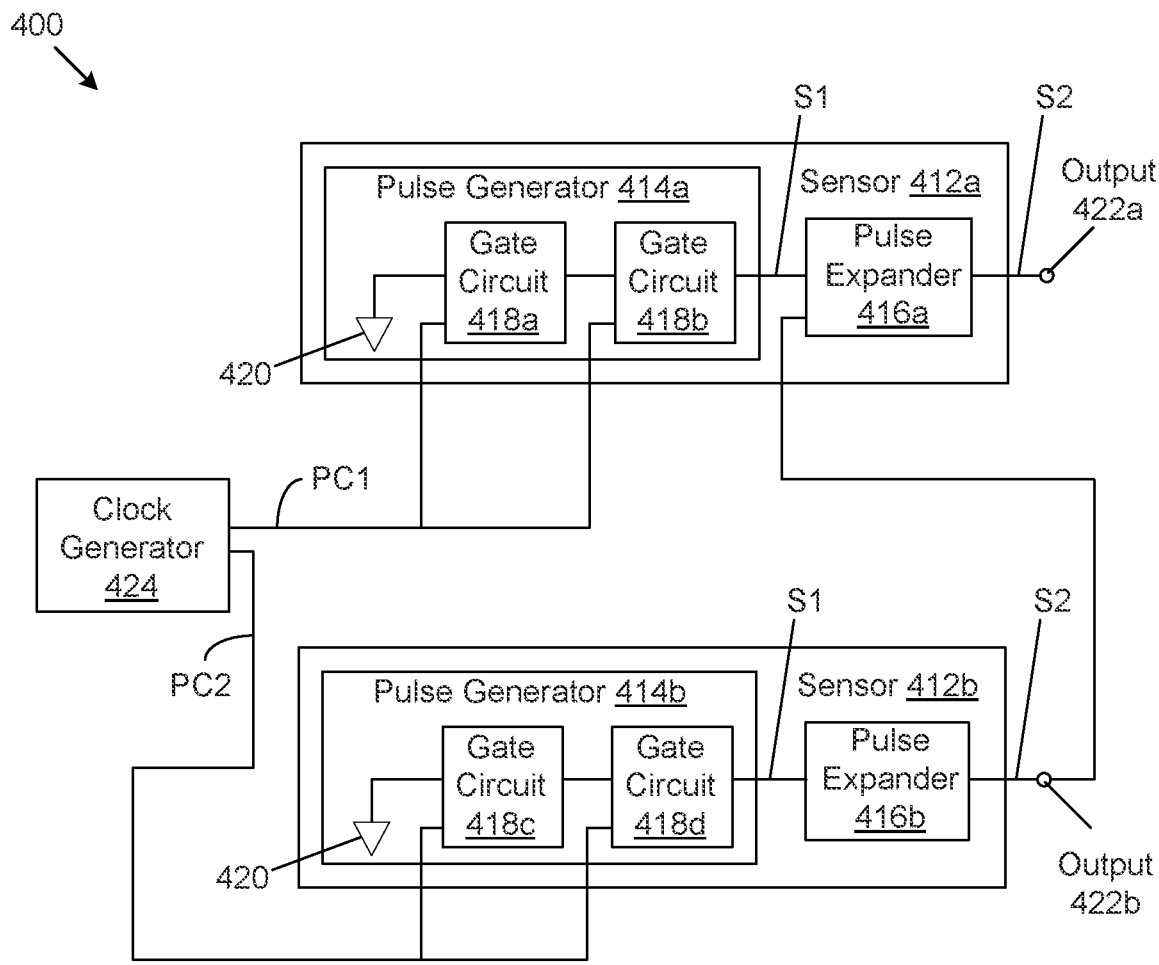
FIG. 4A is a functional block diagram schematically illustrating first and second sensors, each including dynamic gate circuits that can be used to detect a laser fault-injection event.

FIG. 4A is a functional block diagram schematically illustrating a group 400 of sensors including first sensors 412a and second sensors 412b, each including dynamic gate circuits 418 that can be used to detect an LFI event according to some embodiments. The gate circuits 418 may be more sensitive than gate circuits 218, which employ static gate circuits. An IC may include dynamic logic circuitry to perform certain functions. Sensors 412 may be placed close to or within functional blocks on an IC that include dynamic logic circuitry so as to capture the behavior of the dynamic circuitry. Because sensors 412 may include transistors of the same or similar type and/or transistors of similar dimensions of those contained in these functional blocks, the sensors 412 may be more likely to detect LFI events that would affect the dynamic functional block than sensors employing static gate circuits.

The dynamic gate circuits 418 also differ from the static gate circuits 218 in that they operate with a pre-charge phase requiring a pre-charge signal "pc." Referring to FIG. 4A, sensor 412a receives a pre-charge signal PC1 and sensor 412b receives a pre-charge signal PC2. The pre-charge signals are provided by clock generator 424. The clock generator 424 may also be referred to as control circuitry. Operation of gate circuits 418 includes a pre-charge phase and an evaluation or detection phase. The pre-charge and evaluation or detection phases may also be referred to as time periods or periods. The gate circuits 418 may detect an LFI event during the detection phase but not during the pre-charge phase. For this reason, clock generator 424 provides two pre-charge signals, such that the pre-charge cycles of sensor 412a are complementary in time with the pre-charge cycles of sensor 412b. While only one sensor 412a and one sensor 412b are shown in the group 400, other embodiments include multiple sensors 412a and 412b, each of the sensors 412a having pre-charge cycles that complement the pre-charge cycles of sensors 412b in time. In some embodiments, first dynamic inverter circuits operate with first pre-charge periods and first detection periods, second dynamic inverter circuits operate with second pre-charge periods and second detection periods. The first pre-charge periods and the second detection periods are substantially in phase, and the second pre-charge periods and the first detection periods are substantially in phase. In embodiments, each instance of a sensor 412a may be placed spatially close to an instance of sensor 412b on an IC so that a laser strike occurring during the pre-charge phase of sensor 412a occurs during the detection phase of adjacent sensor 412b.

While FIG. 4A shows an embodiment in which a first sensor 412a receives a first pre-charge signal PC1 and a second sensor 412b receives a second pre-charge signal PC2, wherein the first and second pre-charge signals are complementary in time such that first gates 418a, 418b are in a pre-charge phase while second gates 418c, 418d are in a detection phase at the same point in time, in other embodiments, individual gates within a single sensor receive pre-charge signals that are complementary in time. For example, in an embodiment a sensor includes a first gate and a second gate. The first gate receives a first pre-charge signal and the second gate receives a second pre-charge signal. The first and second pre-charge signals are complementary in time such that the first gate within the sensor is in a pre-charge phase while the second gate is in a detection phase at the same point in time.

Sensor 412a includes a pulse generator 414a, which comprises multiple dynamic gate circuits 418a, 418b coupled to each other in an in-series arrangement. Similarly, sensor 412b includes a pulse generator 414b, which comprises multiple dynamic gate circuits 418c, 418d coupled to each other in an in-series arrangement. Each of the pulse generators 414 may comprise any suitable number of gate circuits 418. In some embodiments, each pulse generator 414a, 414b includes six gate circuits 418. The dynamic gate circuits 418 are described below with reference to FIG. 4C.

An input of each pulse generator 414 is coupled to receive a voltage 420, which may be a ground potential in some embodiments or a supply voltage in other embodiments. Pulse generator 414 generates a first signal S1 at an output based on the ground or supply voltage 420. An event may occur when radiation from a laser is incident upon one of the dynamic gate circuits 418 within a pulse generator 414. In various embodiments, the pulse generator 414 may generate a first pulse P1 of the first signal S1 based on an event. The first pulse P1 has a first duration, which may be related to the energy of and length of time radiation is incident on the pulse generator 414.

Each sensor 412 includes a respective pulse expander 416a, 416b, which is coupled to receive the first signal S1 from the pulse generator 414 and generate a second signal S2 based on the first signal S1. A second signal S2 is output from a pulse expander 416a at output 422a and from pulse expander 416b at output 422b. Pulse expander 416 may expand the length of the first duration of first pulse P1. In various embodiments, second signal S2 includes a second pulse P2. The second pulse P2 of the second signal S2 is based on the first pulse P1 and has a second duration. In embodiments, the first duration of the first pulse P1 is less than the second duration of the second pulse P2.

Figure 4B:
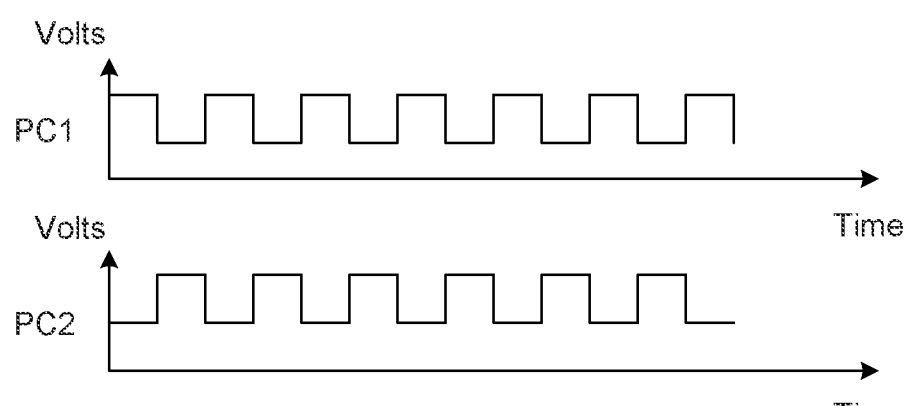
FIG. 4B is a functional block diagram illustrating a timing diagram for pre-charge signals provided to the gate circuits of FIG. 4A.

FIG. 4B is a functional block diagram illustrating a timing diagram for pre-charge signals PC1 and PC2 that are provided to gate circuits 418 by clock generator 424 according to various embodiments. The frequency of the pre-charge "pc" signals is selected so that the pulse rate compensates for current leakage of the transistors in the technology employed. As mentioned, gate circuits 418 operate according to a pre-charge phase and a detection phase, and an LFI event may only be detected during the detection phase. During the pre-charge phase, the pre-charge signal is low. As can be seen in FIG. 4B, pre-charge signal PC1 is high when pre-charge signal PC2 is low, and PC1 is low when PC2 is high. Accordingly, the gate circuits 418a, 418b of pulse generator 414a are capable of detecting an LFI event when PC1 is high, while at the same time gate circuits 418c, 418d of pulse generator 414b are in their pre-charge phase. Conversely, when gate circuits 418a, 418b of pulse generator 414a are incapable of detecting an LFI event because PC1 is low, gate circuits 418c, 418d of pulse generator 414b are capable of detecting an LFI event because PC2 is high and gate circuits 418c, 418d are in their detection phase. As mentioned, a set of the dynamic sensors in close physical proximity to one another with pre-charge cycles in complementary time periods is advantageous in order to provide continuous time coverage for LFI attack detection.

Figure 4C:
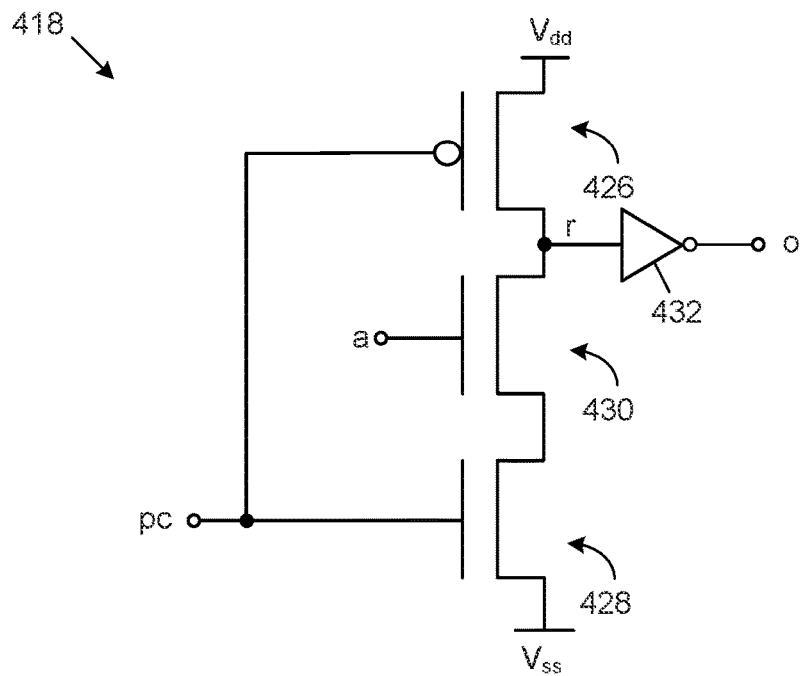
FIG. 4C is a functional block diagram schematically illustrating a gate circuit of FIG. 4A according to various embodiments.

FIG. 4C is a functional block diagram schematically illustrating a gate circuit 418 according to various embodiments. Gate circuit 418 is a dynamic inverter comprising an input "a," pre-charge PMOS transistor 426, pre-charge NMOS transistor 428, NMOS transistor 430, a static inverter 432, and an output "o." The gates of the pre-charge transistors are coupled with a clock circuit, e.g., clock generator 424, to receive a pre-charge signal. An input of the static inverter is coupled with node "r," which connects the drain and source terminals of PMOS transistor 426 and NMOS transistor 430.

Operation of gate circuits 418 includes a pre-charge phase and an evaluation or detection phase. In the pre-charge phase, the pre-charge signal is low (pc=0). In the evaluation phase, the pre-charge signal is high (pc=1). In the pre-charge phase, pc=0 so PMOS transistor 426 is on and NMOS transistor 428 is off. As a result, node "r" is pulled high. An LFI event may be detected during the evaluation phase. For the detection/evaluation phase, assume that the input "a" is low. In the detection phase, the pre-charge signal is high, so PMOS transistor 426 is off and NMOS transistor 428 is on. As there is assumed to be a "0" on input "a," NMOS transistor 430 is also off, and node "r" is floating. If radiation from a laser strikes NMOS transistor 430 during the detection phase while node "r" is floating, the charge induced by the strike will cause NMOS transistor 430 to turn on for a short time period. During this on period, NMOS transistors 430 (with transistor 428) pulls node "r" low causing the output "o" to go high. The resulting pulse at the output is fed to pulse expander circuitry 416 as an indication of an LFI event. Gate circuit 418 is more sensitive that static variants since it has the floating node "r" without restoring current from the other transistor.

Figure 5:
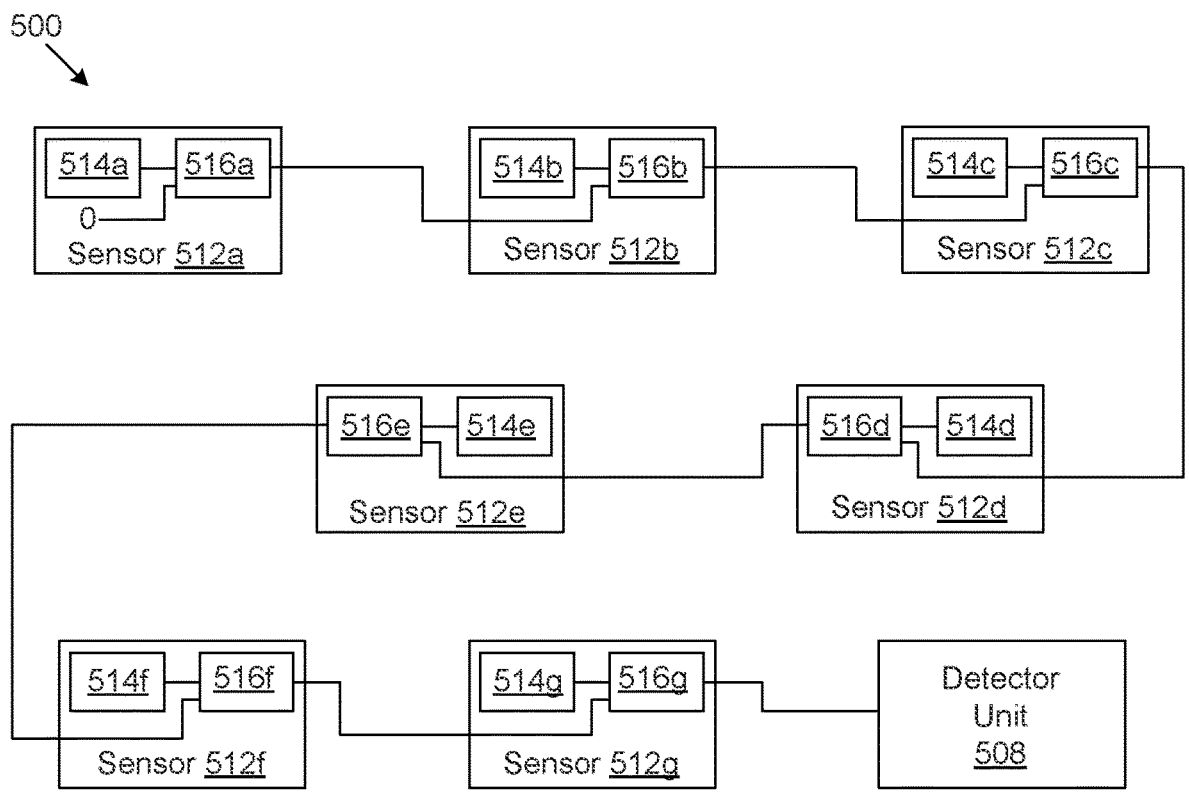
FIG. 5 is a functional block diagram schematically illustrating an array of sensors connected in series according to various embodiments.

FIG. 5 is a functional block diagram schematically illustrating an array 500 of sensors 512a, 512b, 512c, 512d, 512e, 512f, and 512g connected in in series according to various embodiments. The array 500 may be disposed on or within an IC die in a mesh or grid pattern around and/or within a functional block for which LFI event detection capability is desired. Each sensor 512 comprises a respective pulse generator 514a, 514b, 514c, 514d, 514e, 514f, and 514g, and a respective pulse expander 516a, 516b, 516c, 516d, 516e, 516f, and 516g. Except for sensor 512g, the output of each sensor 512 is coupled with the pulse expander of the next sensor 512, e.g., the output of pulse expander 516b in sensor 512b is connected to an input of pulse expander 516c in sensor 512c. A detector unit 508 is coupled with the sensors 512 via the last sensor in the series, e.g., the output of pulse detector 516g in sensor 512g is connected to detector unit 508. The detector unit 508 accumulates pulses and compares a sum of pulses in a time period with a threshold. The detector unit provides a signal to a security manager capable of providing a security response to an LFI event.

In various embodiments, an IC die comprises a functional block located within an area defined of the IC die and the array 500 of sensors 512. The area may be defined terms of width and length dimensions of the IC die, extending through the height of the die. In an embodiment, at least one sensor 512 located is within the area of the IC die where the functional block is located. In another embodiment, at least one sensor 512 is located adjacent to the area of the IC die where the functional block is located.

The IC die may include a plurality of layers. For example, the IC die may include one or more "device layers" that include devices such as transistors. In addition, the IC die may include one or more "metallization layers" that include metal structures to interconnect the devices of the device layers. Sensors 512 include pulse generators 514. The pulse generators 514 comprise gate circuits. In various embodiments, a first one of the gate circuits includes a first transistor that is located in a particular layer of the IC die. In addition, the IC die includes a functional block that includes a second transistor located in a particular layer of the IC die. In some embodiments, the first transistor of the gate circuit and the second transistor of the functional block are located in a same layer of the IC die.

The example gate circuits described herein include transistors of a particular type of technology, e.g., CMOS. In various embodiments, a first one of the gate circuits of pulse generators 514 includes a first transistor of a particular type of technology. The IC die includes a functional block that includes a second transistor, which is of a particular type of technology. In some embodiments, the first transistor of the gate circuit and the second transistor of the functional block are of the same or a similar type of technology. In addition, in some embodiments, the first transistor of the gate circuit and the second transistor of the functional block are of the same or a similar of dimensions.

Figure 6:
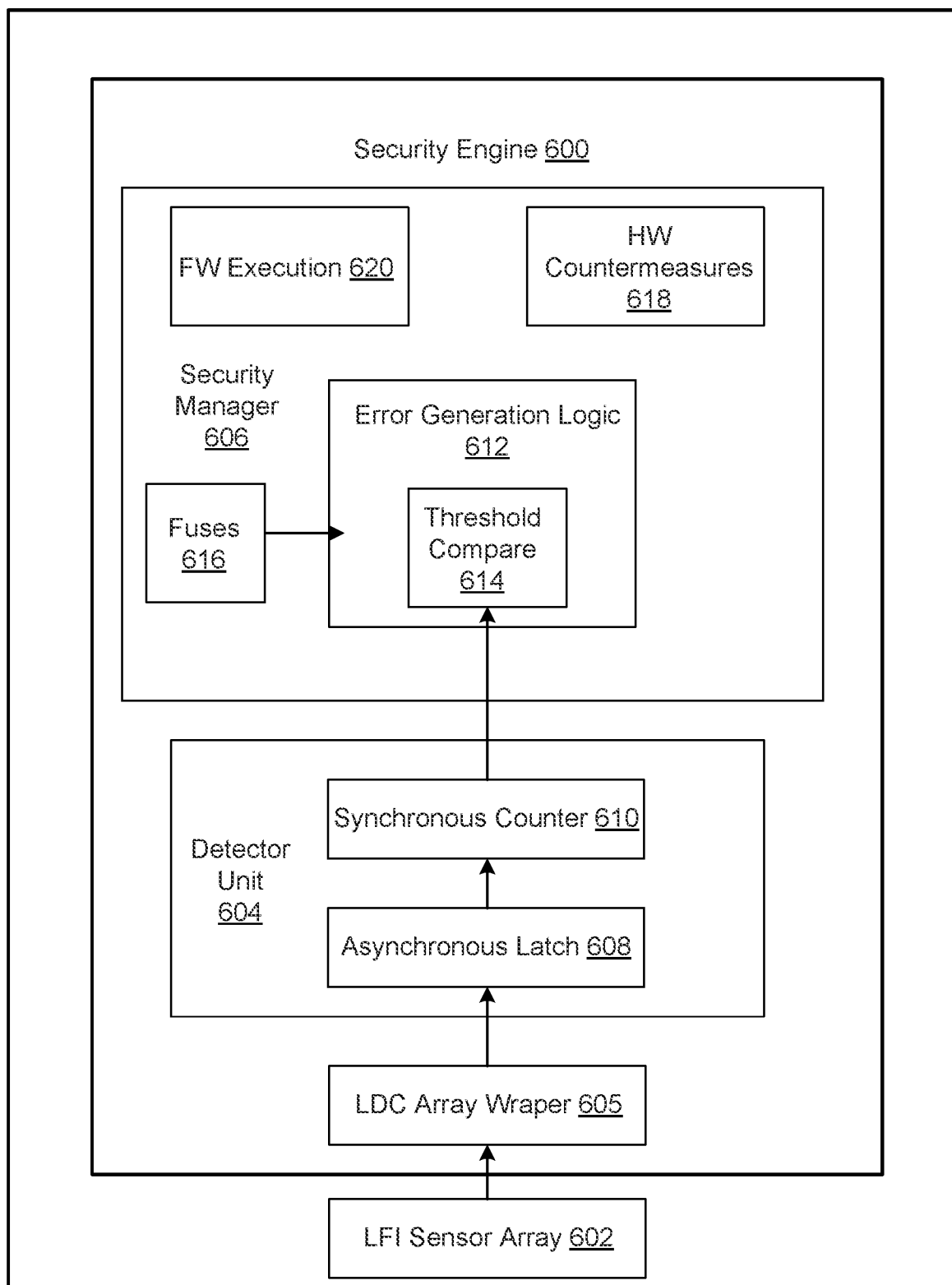
FIG. 6 is a functional block diagram schematically a security engine according to various embodiments.

FIG. 6 is a functional block diagram schematically illustrating a security engine 600 according to various embodiments. The security engine 600 comprises a detector unit 604 and a security manager 606. An array of LFI sensors 602 is coupled with a detector unit 604 via an LFI sensor array wrapper 605. The detector unit 604 comprises an asynchronous latch 608 to latch pulses received from the array of LFI sensors 602 and a synchronous counter 610 to count the pulses. In an embodiment security engine 600 is included within a SoC and the array of LFI sensors 602 are arranged so as to detect a laser scanning attack on the security engine.

The synchronous counter 610 counts the number of laser detections and provides the count value to error generation logic 612. This block contains a timer and is fed enables from fuses to determine which type of countermeasures to invoke. To avoid false positives, the number of events detected within a time period is compared to a threshold by threshold compare logic 614. The threshold and length of the time period may be programmed into fuses 616 during silicon manufacturing. The security engine 600 will trigger countermeasures only if the number of events within the period exceeds the threshold.

In various embodiments, security engine provides hardware (HW) countermeasures 618 and firmware (FW) countermeasures 620. If fuses 616 are configured to generate FW countermeasures, FW executing on the security engine 600 will be invoked by the error generation logic 612 invoking a FW exception. A FW exception handler will take actions such as resetting the security processor, clearing memory, or isolating itself from the rest of the SoC, etc. If the fuses 616 are configured to generate HW countermeasures, the security engine 600 may take the same or similar countermeasure operations the FW exception handler takes. In different embodiments, FW or HW countermeasures are selected depending on the flexibility, survivability, and security requirements of the functional block (SoC, CPU, graphics processor, memory, or other circuitry) that is deemed sensitive or vulnerable, or the functional block for which detection of a laser-induced event or attack is deemed important.

Figure 7:
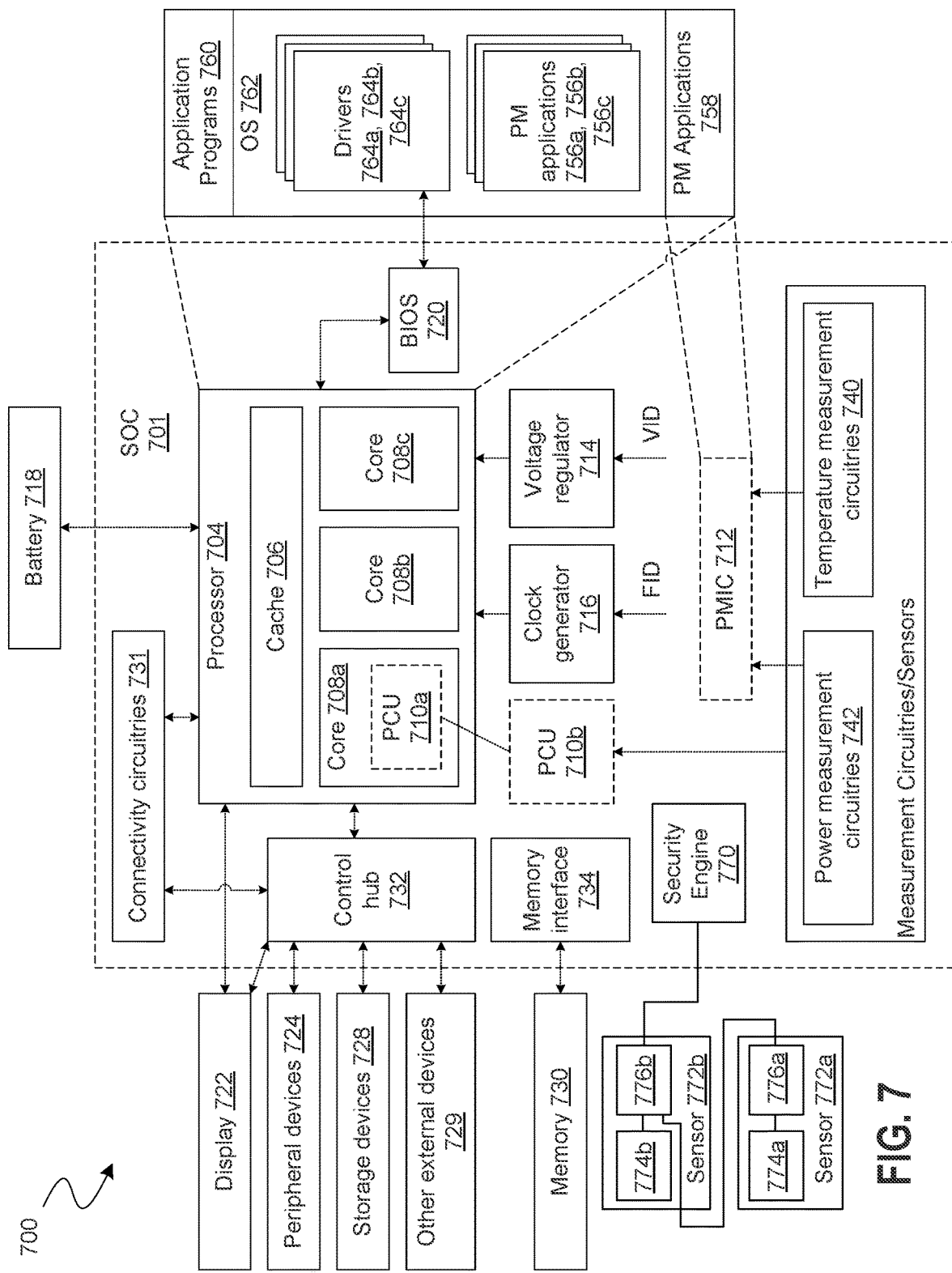
FIG. 7 illustrates a computer system or computing device comprising circuitry to detect laser-injected faults in accordance with some embodiments.

FIG. 7 illustrates a computer system or computing device 700 (also referred to as device 700) comprising circuitry to detect laser-injected faults in accordance with some embodiments. It is pointed out that those elements of FIG. 7 having the same reference numbers (or names) as the elements of any other figure can operate or function in any manner similar to that described, but are not limited to such.

In some embodiments, device 700 represents an appropriate computing device, such as a computing tablet, a mobile phone or smart-phone, a laptop, a desktop, an Internet-of-Things (JOT) device, a server, a wearable device, a set-top box, a wireless-enabled e-reader, or the like. It will be understood that certain components are shown generally, and not all components of such a device are shown in device 700.

In an example, the device 700 comprises a SOC (System-on-Chip) 701. An example boundary of the SOC 701 is illustrated using dotted lines in FIG. 7, with some example components being illustrated to be included within SOC 701—however, SOC 701 may include any appropriate components of device 700.

In some embodiments, device 700 includes processor 704. Processor 704 can include one or more physical devices, such as microprocessors, application processors, microcontrollers, programmable logic devices, processing cores, or other processing means. The processing operations performed by processor 704 include the execution of an operating platform or operating system on which applications and/or device functions are executed. The processing operations include operations related to I/O (input/output) with a human user or with other devices, operations related to power management, operations related to connecting computing device 700 to another device, and/or the like. The processing operations may also include operations related to audio I/O and/or display I/O.

In some embodiments, processor 704 includes multiple processing cores (also referred to as cores) 708a, 708b, 708c. Although merely three cores 708a, 708b, 708c are illustrated in FIG. 7, the processor 704 may include any other appropriate number of processing cores, e.g., tens, or even hundreds of processing cores. Processor cores 708a, 708b, 708c may be implemented on a single integrated circuit (IC) chip. Moreover, the chip may include one or more shared and/or private caches, buses or interconnections, graphics and/or memory controllers, or other components.

In some embodiments, processor 704 includes cache 706. In an example, sections of cache 706 may be dedicated to individual cores 708 (e.g., a first section of cache 706 dedicated to core 708a, a second section of cache 706 dedicated to core 708b, and so on). In an example, one or more sections of cache 706 may be shared among two or more of cores 708. Cache 706 may be split in different levels, e.g., level 1 (L1) cache, level 2 (L2) cache, level 3 (L3) cache, etc.

In some embodiments, a given processor core (e.g., core 708a) may include a fetch unit to fetch instructions (including instructions with conditional branches) for execution by the core 708a. The instructions may be fetched from any storage devices such as the memory 730. Processor core 708a may also include a decode unit to decode the fetched instruction. For example, the decode unit may decode the fetched instruction into a plurality of micro-operations. Processor core 708a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 708a (for example) may be an out-of-order processor core in one embodiment. Processor core 708a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 708a may also include a bus unit to enable communication between components of the processor core 708a and other components via one or more buses. Processor core 708a may also include one or more registers to store data accessed by various components of the core 708a (such as values related to assigned app priorities and/or sub-system states (modes) association.

In some embodiments, device 700 comprises connectivity circuitries 731. For example, connectivity circuitries 731 includes hardware devices (e.g., wireless and/or wired connectors and communication hardware) and/or software components (e.g., drivers, protocol stacks), e.g., to enable device 700 to communicate with external devices. Device 700 may be separate from the external devices, such as other computing devices, wireless access points or base stations, etc.

In an example, connectivity circuitries 731 may include multiple different types of connectivity. To generalize, the connectivity circuitries 731 may include cellular connectivity circuitries, wireless connectivity circuitries, etc. Cellular connectivity circuitries of connectivity circuitries 731 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 731 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 731 may include a network interface, such as a wired or wireless interface, e.g., so that a system embodiment may be incorporated into a wireless device, for example, cell phone or personal digital assistant.

In some embodiments, device 700 comprises control hub 732, which represents hardware devices and/or software components related to interaction with one or more I/O devices. For example, processor 704 may communicate with one or more of display 722, one or more peripheral devices 724, storage devices 728, one or more other external devices 729, etc., via control hub 732. Control hub 732 may be a chipset, a Platform Control Hub (PCH), and/or the like.

For example, control hub 732 illustrates one or more connection points for additional devices that connect to device 700, e.g., through which a user might interact with the system. For example, devices (e.g., devices 729) that can be attached to device 700 include microphone devices, speaker or stereo systems, audio devices, video systems or other display devices, keyboard or keypad devices, or other I/O devices for use with specific applications such as card readers or other devices.

As mentioned above, control hub 732 can interact with audio devices, display 722, etc. For example, input through a microphone or other audio device can provide input or commands for one or more applications or functions of device 700. Additionally, audio output can be provided instead of, or in addition to display output. In another example, if display 722 includes a touch screen, display 722 also acts as an input device, which can be at least partially managed by control hub 732. There can also be additional buttons or switches on computing device 700 to provide I/O functions managed by control hub 732. In one embodiment, control hub 732 manages devices such as accelerometers, cameras, light sensors or other environmental sensors, or other hardware that can be included in device 700. The input can be part of direct user interaction, as well as providing environmental input to the system to influence its operations (such as filtering for noise, adjusting displays for brightness detection, applying a flash for a camera, or other features).

In some embodiments, control hub 732 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 722 represents hardware (e.g., display devices) and software (e.g., drivers) components that provide a visual and/or tactile display for a user to interact with device 700. Display 722 may include a display interface, a display screen, and/or hardware device used to provide a display to a user. In some embodiments, display 722 includes a touch screen (or touch pad) device that provides both output and input to a user. In an example, display 722 may communicate directly with the processor 704. Display 722 can be one or more of an internal display device, as in a mobile electronic device or a laptop device or an external display device attached via a display interface (e.g., DisplayPort, etc.). In one embodiment display 722 can be a head mounted display (HMD) such as a stereoscopic display device for use in virtual reality (VR) applications or augmented reality (AR) applications.

In some embodiments and although not illustrated in the figure, in addition to (or instead of) processor 704, device 700 may include Graphics Processing Unit (GPU) comprising one or more graphics processing cores, which may control one or more aspects of displaying contents on display 722.

Control hub 732 (or platform controller hub) may include hardware interfaces and connectors, as well as software components (e.g., drivers, protocol stacks) to make peripheral connections, e.g., to peripheral devices 724.

It will be understood that device 700 could both be a peripheral device to other computing devices, as well as have peripheral devices connected to it. Device 700 may have a "docking" connector to connect to other computing devices for purposes such as managing (e.g., downloading and/or uploading, changing, synchronizing) content on device 700. Additionally, a docking connector can allow device 700 to connect to certain peripherals that allow computing device 700 to control content output, for example, to audiovisual or other systems.

In addition to a proprietary docking connector or other proprietary connection hardware, device 700 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 731 may be coupled to control hub 732, e.g., in addition to, or instead of, being coupled directly to the processor 704. In some embodiments, display 722 may be coupled to control hub 732, e.g., in addition to, or instead of, being coupled directly to processor 704.

In some embodiments, device 700 comprises memory 730 coupled to processor 704 via memory interface 734. Memory 730 includes memory devices for storing information in device 700. Memory can include nonvolatile (state does not change if power to the memory device is interrupted) and/or volatile (state is indeterminate if power to the memory device is interrupted) memory devices. Memory device 730 can be a dynamic random access memory (DRAM) device, a static random access memory (SRAM) device, flash memory device, phase-change memory device, or some other memory device having suitable performance to serve as process memory. In one embodiment, memory 730 can operate as system memory for device 700, to store data and instructions for use when the one or more processors 704 executes an application or process. Memory 730 can store application data, user data, music, photos, documents, or other data, as well as system data (whether long-term or temporary) related to the execution of the applications and functions of device 700.

Elements of various embodiments and examples are also provided as a machine-readable medium (e.g., memory 730) for storing the computer-executable instructions (e.g., instructions to implement any other processes discussed herein). The machine-readable medium (e.g., memory 730) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 700 comprises temperature measurement circuitries 740, e.g., for measuring temperature of various components of device 700. In an example, temperature measurement circuitries 740 may be embedded, or coupled or attached to various components, whose temperature are to be measured and monitored. For example, temperature measurement circuitries 740 may measure temperature of (or within) one or more of cores 708a, 708b, 708c, voltage regulator 714, memory 730, a mother-board of SOC 701, and/or any appropriate component of device 700.

In some embodiments, device 700 comprises power measurement circuitries 742, e.g., for measuring power consumed by one or more components of the device 700. In an example, in addition to, or instead of, measuring power, the power measurement circuitries 742 may measure voltage and/or current. In an example, the power measurement circuitries 742 may be embedded, or coupled or attached to various components, whose power, voltage, and/or current consumption are to be measured and monitored. For example, power measurement circuitries 742 may measure power, current and/or voltage supplied by one or more voltage regulators 714, power supplied to SOC 701, power supplied to device 700, power consumed by processor 704 (or any other component) of device 700, etc.

In some embodiments, device 700 comprises one or more voltage regulator circuitries, generally referred to as voltage regulator (VR) 714. VR 714 generates signals at appropriate voltage levels, which may be supplied to operate any appropriate components of the device 700. Merely as an example, VR 714 is illustrated to be supplying signals to processor 704 of device 700. In some embodiments, VR 714 receives one or more Voltage Identification (VID) signals, and generates the voltage signal at an appropriate level, based on the VID signals. Various type of VRs may be utilized for the VR 714. For example, VR 714 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 710a/b and/or PMIC 712. In some embodiments, each core has a network of distributed LDOs to provide efficient control for power management. The LDOs can be digital, analog, or a combination of digital or analog LDOs.

In some embodiments, device 700 comprises one or more clock generator circuitries, generally referred to as clock generator 716. Clock generator 716 generates clock signals at appropriate frequency levels, which may be supplied to any appropriate components of device 700. Merely as an example, clock generator 716 is illustrated to be supplying clock signals to processor 704 of device 700. In some embodiments, clock generator 716 receives one or more Frequency Identification (FID) signals, and generates the clock signals at an appropriate frequency, based on the FID signals.

In some embodiments, device 700 comprises battery 718 supplying power to various components of device 700. Merely as an example, battery 718 is illustrated to be supplying power to processor 704. Although not illustrated in the figures, device 700 may comprise a charging circuitry, e.g., to recharge the battery, based on Alternating Current (AC) power supply received from an AC adapter.

In some embodiments, device 700 comprises Power Control Unit (PCU) 710 (also referred to as Power Management Unit (PMU), Power Controller, etc.). In an example, some sections of PCU 710 may be implemented by one or more processing cores 708, and these sections of PCU 710 are symbolically illustrated using a dotted box and labelled PCU 710a. In an example, some other sections of PCU 710 may be implemented outside the processing cores 708, and these sections of PCU 710 are symbolically illustrated using a dotted box and labelled as PCU 710b. PCU 710 may implement various power management operations for device 700. PCU 710 may include hardware interfaces, hardware circuitries, connectors, registers, etc., as well as software components (e.g., drivers, protocol stacks), to implement various power management operations for device 700.

In some embodiments, device 700 comprises Power Management Integrated Circuit (PMIC) 712, e.g., to implement various power management operations for device 700. In some embodiments, PMIC 712 is a Reconfigurable Power Management ICs (RPMICs) and/or an IMVP (Intel® Mobile Voltage Positioning). In an example, the PMIC is within an IC chip separate from processor 704. PMIC 712 may implement various power management operations for device 700. PMIC 712 may include hardware interfaces, hardware circuitries, connectors, registers, etc., as well as software components (e.g., drivers, protocol stacks), to implement various power management operations for device 700.

In an example, device 700 comprises one or both PCU 710 or PMIC 712. In an example, any one of PCU 710 or PMIC 712 may be absent in device 700, and hence, these components are illustrated using dotted lines.

Various power management operations of device 700 may be performed by PCU 710, by PMIC 712, or by a combination of PCU 710 and PMIC 712. For example, PCU 710 and/or PMIC 712 may select a power state (e.g., P-state) for various components of device 700. For example, PCU 710 and/or PMIC 712 may select a power state (e.g., in accordance with the ACPI (Advanced Configuration and Power Interface) specification) for various components of device 700. Merely as an example, PCU 710 and/or PMIC 712 may cause various components of the device 700 to transition to a sleep state, to an active state, to an appropriate C state (e.g., CO state, or another appropriate C state, in accordance with the ACPI specification), etc. In an example, PCU 710 and/or PMIC 712 may control a voltage output by VR 714 and/or a frequency of a clock signal output by the clock generator, e.g., by outputting the VID signal and/or the FID signal, respectively. In an example, PCU 710 and/or PMIC 712 may control battery power usage, charging of battery 718, and features related to power saving operation.

The clock generator 716 can comprise a phase locked loop (PLL), frequency locked loop (FLL), or any suitable clock source. In some embodiments, each core of processor 704 has its own clock source. As such, each core can operate at a frequency independent of the frequency of operation of the other core. In some embodiments, PCU 710 and/or PMIC 712 performs adaptive or dynamic frequency scaling or adjustment. For example, clock frequency of a processor core can be increased if the core is not operating at its maximum power consumption threshold or limit. In some embodiments, PCU 710 and/or PMIC 712 determines the operating condition of each core of a processor, and opportunistically adjusts frequency and/or power supply voltage of that core without the core clocking source (e.g., PLL of that core) losing lock when the PCU 710 and/or PMIC 712 determines that the core is operating below a target performance level. For example, if a core is drawing current from a power supply rail less than a total current allocated for that core or processor 704, then PCU 710 and/or PMIC 712 can temporarily increase the power draw for that core or processor 704 (e.g., by increasing clock frequency and/or power supply voltage level) so that the core or processor 704 can perform at a higher performance level. As such, voltage and/or frequency can be increased temporality for processor 704 without violating product reliability.

In an example, PCU 710 and/or PMIC 712 may perform power management operations, e.g., based at least in part on receiving measurements from power measurement circuitries 742, temperature measurement circuitries 740, charge level of battery 718, and/or any other appropriate information that may be used for power management. To that end, PMIC 712 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor (s) may be directly coupled to PCU 710 and/or PMIC 712 in at least one embodiment to allow PCU 710 and/or PMIC 712 to manage processor core energy at least in part based on value(s) detected by one or more of the sensors.

Also illustrated is an example software stack of device 700 (although not all elements of the software stack are illustrated). Merely as an example, processors 704 may execute application programs 760, Operating System 762, one or more Power Management (PM) specific application programs (e.g., generically referred to as PM applications 758), and/or the like. PM applications 758 may also be executed by the PCU 710 and/or PMIC 712. OS 762 may also include one or more PM applications 756a, 756b, 756c. The OS 762 may also include various drivers 764a, 764b, 764c, etc., some of which may be specific for power management purposes. In some embodiments, device 700 may further comprise a Basic Input/Output System (BIOS) 720. BIOS 720 may communicate with OS 762 (e.g., via one or more drivers 764), communicate with processors 704, etc.

For example, one or more of PM applications 758, 756, drivers 764, BIOS 720, etc. may be used to implement power management specific tasks, e.g., to control voltage and/or frequency of various components of device 700, to control wake-up state, sleep state, and/or any other appropriate power state of various components of device 700, control battery power usage, charging of the battery 718, features related to power saving operation, etc.

In various embodiments, device 700 comprises a security engine 770, which includes a detector unit (not shown) to detect an LFI event and a security manager (not shown) to provide a security response based on detection of the event. In addition, device 700 comprises two or more sensors 772a and 772b, arranged in an "in-series arrangement." Each sensor 772 comprises a respective pulse generator 774a, 774b, and a respective pulse expander 776a, 776b. The detector unit within security engine 770 is coupled with the sensors 772. The security manager is coupled with the detector unit and provides the security response in response to a signal from the detector unit.

The pulse generators 774 include two or more gate circuits connected in series. When radiation from a laser reaches one of the pulse generators 774, a short pulse is induced in one of the gate circuits within the pulse generator 774. The pulse is amplified in magnitude by the gain of the gate circuit and transmitted along to a next gate circuit within the pulse generator 774. The last gate circuit in the chain transmits the pulse to the pulse expander circuit 776, which expands the pulse that is generated by the pulse generator circuit 774. In addition, the pulse expander circuit 776 combines a pulse propagated by a previous sensor 772.

Sensors 772 may be employed to detect a laser-induced event or attack on a portion of device 700. Sensors 772 may be placed at various locations, such as locations in close physical proximity with a functional block deemed sensitive or vulnerable, or a functional block for which detection of a laser-induced event or attack is deemed important. In some embodiments, one or more sensors 772 are placed within a functional block, e.g., sensor 772a is placed within security engine 770. In some embodiments, one or more sensors 772 are placed in close physical proximity with a functional block.

In the foregoing description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. A module may comprise a circuit or circuitry, as defined below. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

As used herein, the terms "circuit" and "circuitry" comprise various electronic and electrical devices ("hardware"). Examples of hardware include analog circuits and analog circuit components (e.g., resistors, capacitors, inductors, diodes, and transistors). Other examples of hardware include digital circuits and digital circuit components, such as logic devices implementing Boolean functions. Additional examples of hardware include volatile and non-volatile memory devices, such as registers, read-only memory (ROM), random access memory (RAM), and flash memory.

As used herein, the term "hardware interface" refers to one or more physical components of a given device, where said one or more physical components accommodate coupling to interact with one or more physical components of another device, e.g., via electrical or optical signals. For example, a hardware interface may comprise conductive contacts of a connector or a socket that receives a connector. As another example, a hardware interface may comprise metal contacts, pads, metallization features, or other interconnect structures on a surface of or within a circuit board or integrated circuit (IC) chip. As a further example, a hardware interface may comprise an interconnect between contacts of respective components, such as solder or an interposer. As a yet another example, a hardware interface may comprise an electrically conductive trace on a printed circuit board or an electrically conductive wire.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An integrated circuit (IC) die comprising: a sensor comprising: a pulse generator comprising gate circuits coupled to each other in an in-series arrangement, wherein an input of the pulse generator is coupled to receive a voltage, the pulse generator to generate a first signal based on the voltage, wherein the pulse generator is to generate a first pulse of the first signal based on an event wherein radiation from a laser is incident upon the pulse generator; and a pulse expander coupled to receive the first signal from the pulse generator, the pulse expander to generate a second signal based on the first signal, wherein a second pulse of the second signal is based on the first pulse, and wherein a first duration of the first pulse is less than a second duration of the second pulse.

Example 2: The IC die of example 1, wherein the gate circuits each comprise a respective inverter gate.

Example 3: The IC die of example 1, wherein the voltage is one of a ground potential or a supply voltage.

Example 4: The IC die of example 1, further comprising control circuitry to generate multiple pre-charge signals, wherein the gate circuits are each further coupled to receive a respective pre-charge signal.

Example 5: The IC die of example 4, wherein the sensor is a first sensor, the pulse generator is a first pulse generator and the gate circuits are first gate circuits; wherein the IC die further comprises a second sensor comprising a second pulse generator, the second pulse generator comprising second gate circuits; wherein the pre-charge signal is a first pre-charge signal and the first gate circuits of the first sensor are each coupled to receive a respective first pre-charge signal; wherein the second gate circuits of the second sensor are each coupled to receive a respective second pre-charge signal; and wherein the first pre-charge signal is complementary in time with the second pre-charge signal.

Example 6: The IC die of example 1, wherein the pulse expander comprises: a NOR gate coupled to receive the first signal, and to output a third signal based on the first signal; and a NAND gate coupled to receive the third signal, and to generate the second signal based on the third signal.

Example 7: The IC die of example 1, wherein the sensor is a first sensor, the pulse generator is a first pulse generator, and the pulse expander is a first pulse expander, the IC die further comprising: multiple sensors coupled in series with each other, the multiple sensors each comprising a respective pulse generator, and a respective pulse expander.

Example 8: The IC die of example 7, wherein: a second sensor of the multiple sensor comprises a second pulse generator, and a second pulse expander; and the second pulse expander is coupled to receive the second signal from the first pulse expander, and another signal from the second pulse generator.

Example 9: The IC die of example 1, further comprising: a detector unit coupled to the sensor, the detector unit to detect the event based on the second pulse.

Example 10: The IC die of example 9, further comprising: a security manager, responsive to the detector unit, to provide a security response based on the detection of the event.

Example 11: An integrated circuit (IC) die comprising: a functional block located within an area of the IC die; and a laser detection circuit comprising: a pulse generator comprising gate circuits coupled to each other in an in-series arrangement, wherein an input of the pulse generator is coupled to receive a voltage, the pulse generator to generate a first signal based on the voltage, wherein the pulse generator is to generate a first pulse of the first signal based on a radiation event at the pulse generator; and a pulse expander coupled to receive the first signal from the pulse generator, the pulse expander comprising: a NOR gate to receive the first signal and to generate a second signal based on the first signal; and a NAND gate coupled to receive the second signal, and to generate a third signal based on the second signal, wherein a second pulse of the third signal is based on the first pulse.

Example 12: The IC die of example 11, wherein the laser detection circuit is within the area of the IC die where the functional block is located.

Example 13: The IC die of example 11, wherein the laser detection circuit is adjacent to the area of the IC die where the functional block is located.

Example 14: The IC die of example 11, wherein the laser detection circuit is a first laser detection circuit, the pulse generator is a first pulse generator, and the pulse expander is a first pulse expander, the IC die further comprising: multiple laser detection circuits coupled in series with each other and arranged in a grid pattern, the multiple laser detection circuits each comprising a respective pulse generator, and a respective pulse expander.

Example 15: The IC die of example 11, wherein a first one of the gate circuits includes a first transistor and the functional block includes a second transistor, wherein the first transistor and the second transistor are of a similar technology type and similar dimensions.

Example 16: A system comprising: a processor coupled to a memory; security manager circuitry; and a plurality of sensors, each sensor comprising: a pulse generator comprising gate circuits coupled to each other in an in-series arrangement, the pulse generator to generate a first pulse in response to a transistor in one of the gate circuits being irradiated by a laser, and a pulse expander coupled to receive the first pulse from the pulse generator, the pulse expander to generate a second signal based on the first pulse, wherein a first duration of the first pulse is less than a second duration of the second pulse.

Example 17: The system of example 16, wherein the gate circuits comprise dynamic logic circuits.

Example 18: The system of example 16, wherein: a first sensor comprises a first pulse generator, the first pulse generator comprising two or more first dynamic inverter circuits, each of the first dynamic inverter circuits to operate with first pre-charge periods and first detection periods; a second sensor comprises a second pulse generator, the second pulse generator comprising two or more second dynamic inverter circuits, each of the second dynamic inverter circuits to operate with second pre-charge periods and second detection periods; wherein the first pre-charge periods and the second detection periods are substantially in phase; and the second pre-charge periods and the first detection periods are substantially in phase.

Example 19: The system of example 18, wherein the first sensor and the second sensor are adjacent to one another.

Example 20: The system of example 16, wherein the gate circuits comprise of OR gates, AND gates, NOR gates, NAND gates, or XOR gates.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An integrated circuit (IC) die comprising:
a sensor comprising:
  a pulse generator comprising gate circuits coupled to each other in an in-series arrangement, wherein an input of the pulse generator is coupled to receive a voltage, the pulse generator to generate a first signal based on the voltage, wherein the pulse generator is to generate a first pulse of the first signal in response to an event wherein radiation from a laser is incident upon the pulse generator; and
  a pulse expander coupled to receive the first signal from the pulse generator, the pulse expander to generate a second pulse off of the first pulse, the first pulse having a first pulse width, the second pulse having a wider pulse width than the first pulse width.

2. The IC die of claim 1, wherein the gate circuits each comprise a respective inverter gate.

3. The IC die of claim 1, wherein the voltage is one of a ground potential or a supply voltage.

4. The IC die of claim 1, further comprising control circuitry to generate multiple pre-charge signals, wherein the gate circuits are each further coupled to receive a respective pre-charge signal.

5. The IC die of claim 4, wherein the sensor is a first sensor, the pulse generator is a first pulse generator and the gate circuits are first gate circuits;
  wherein the IC die further comprises a second sensor comprising a second pulse generator, the second pulse generator comprising second gate circuits;
  wherein the pre-charge signal is a first pre-charge signal and the first gate circuits of the first sensor are each coupled to receive a respective first pre-charge signal;
  wherein the second gate circuits of the second sensor are each coupled to receive a respective second pre-charge signal; and
  wherein the first pre-charge signal is complementary in time with the second pre-charge signal.

6. The IC die of claim 1, wherein the pulse expander comprises:
  a NOR gate coupled to receive the first signal, and to output a third signal based on the first signal; and
  a NAND gate coupled to receive the third signal, and to generate the second signal based on the third signal.

7. The IC die of claim 1, wherein the sensor is a first sensor, the pulse generator is a first pulse generator, and the pulse expander is a first pulse expander, the IC die further comprising:
  multiple sensors coupled in series with each other, the multiple sensors each comprising a respective pulse generator, and a respective pulse expander.

8. The IC die of claim 7, wherein:
  a second sensor of the multiple sensor comprises a second pulse generator, and a second pulse expander; and
  the second pulse expander is coupled to receive the second signal from the first pulse expander, and another signal from the second pulse generator.

9. The IC die of claim 1, further comprising:
  a detector unit coupled to the sensor, the detector unit to detect the event based on the second pulse.

10. The IC die of claim 9, further comprising:
  a security manager, responsive to the detector unit, to provide a security response based on the detection of the event.

11. An integrated circuit (IC) die comprising:
  a functional block located within an area of the IC die; and
  a laser detection circuit comprising:
    a pulse generator comprising gate circuits coupled to each other in an in-series arrangement, wherein an input of the pulse generator is coupled to receive a voltage, the pulse generator to generate a first signal based on the voltage, wherein the pulse generator is to generate a first pulse of the first signal based on a laser radiation event at the pulse generator; and
    a pulse expander coupled to receive the first signal from the pulse generator, the pulse expander comprising:
      a NOR gate to receive the first signal and to generate a second signal based on the first signal; and
      a NAND gate coupled to receive the second signal, and to generate a third signal based on the second signal, wherein a second pulse of the third signal is generated from the first pulse, the first pulse having a first pulse width, the second pulse having a wider pulse width than the first pulse width.

12. The IC die of claim 11, wherein the laser detection circuit is within the area of the IC die where the functional block is located.

13. The IC die of claim 11, wherein the laser detection circuit is adjacent to the area of the IC die where the functional block is located.

14. The IC die of claim 11, wherein the laser detection circuit is a first laser detection circuit, the pulse generator is a first pulse generator, and the pulse expander is a first pulse expander, the IC die further comprising:
  multiple laser detection circuits coupled in series with each other and arranged in a grid pattern, the multiple laser detection circuits each comprising a respective pulse generator, and a respective pulse expander.

15. The IC die of claim 11, wherein a first one of the gate circuits includes a first transistor and the functional block includes a second transistor, wherein the first transistor and the second transistor are of a similar technology type and similar dimensions.

16. A system comprising:
  a processor coupled to a memory;
  security manager circuitry; and
  a plurality of sensors, each sensor comprising:
    a pulse generator comprising gate circuits coupled to each other in an in-series arrangement, the pulse generator to generate a first pulse in response to a transistor in one of the gate circuits being irradiated by a laser, and
    a pulse expander coupled to receive the first pulse from the pulse generator, the pulse expander to generate a second signal based on the first pulse, wherein a first duration of the first pulse is less than a second duration of the second pulse.

17. The system of claim 16, wherein the gate circuits comprise dynamic logic circuits.

18. The system of claim 16, wherein:
  a first sensor comprises a first pulse generator, the first pulse generator comprising two or more first dynamic inverter circuits, each of the first dynamic inverter circuits to operate with first pre-charge periods and first detection periods;
  a second sensor comprises a second pulse generator, the second pulse generator comprising two or more second dynamic inverter circuits, each of the second dynamic inverter circuits to operate with second pre-charge periods and second detection periods;

wherein the first pre-charge periods and the second detection periods are substantially in phase; and the second pre-charge periods and the first detection periods are substantially in phase.

19. The system of claim 18, wherein the first sensor and the second sensor are adjacent to one another.

20. The system of claim 16, wherein the gate circuits comprise of OR gates, AND gates, NOR gates, NAND gates, or XOR gates.

* * * * *